United States Patent [19]
Gardner, III

[11] Patent Number: 5,887,923
[45] Date of Patent: Mar. 30, 1999

[54] SLING SYSTEM AND METHOD FOR HANDLING SHEETS OR PLATES

[76] Inventor: Homer E. Gardner, III, 1092 Jupiter Park La., Jupiter, Fla. 33458

[21] Appl. No.: 848,483

[22] Filed: May 8, 1997

[51] Int. Cl.$^6$ ........................................... B66C 1/16
[52] U.S. Cl. ............................. 294/81.55; 294/74
[58] Field of Search ..................... 294/67.1, 67.4, 294/74, 81.2, 81.5, 81.55, 82.12, 149–155, 157; 206/451, 453

[56] References Cited

U.S. PATENT DOCUMENTS

| | | |
|---|---|---|
| 2,452,392 | 10/1948 | Philbin . |
| 2,792,252 | 5/1957 | Ernst ........................................ 294/74 |
| 2,793,903 | 5/1957 | Mallard . |
| 3,290,083 | 12/1966 | Norton ..................................... 294/74 |
| 3,368,837 | 2/1968 | Norton . |
| 3,466,080 | 9/1969 | Norton ..................................... 294/74 |
| 3,743,341 | 7/1973 | Gale . |
| 3,838,779 | 10/1974 | Dawson . |
| 3,840,262 | 10/1974 | Foster et al. ............................... 294/74 |
| 4,022,507 | 5/1977 | Marino . |
| 4,045,072 | 8/1977 | Brown ...................................... 294/74 |
| 4,066,287 | 1/1978 | Rowley . |
| 4,156,498 | 5/1979 | Miller .................................. 294/150 X |
| 4,188,168 | 2/1980 | Brown et al. . |
| 4,350,380 | 9/1982 | Williams . |
| 4,441,748 | 4/1984 | St. Germain ............................... 294/74 |
| 4,565,399 | 1/1986 | Cranston .................................. 294/74 |
| 5,098,143 | 3/1992 | Hill . |
| 5,238,279 | 8/1993 | Anteau . |

FOREIGN PATENT DOCUMENTS

| | | | |
|---|---|---|---|
| 202737 | 4/1959 | Australia ................................. 294/74 |
| 150550 | 8/1985 | European Pat. Off. ................. 294/74 |
| 1280690 | 11/1961 | France ..................................... 294/74 |
| 3338654 | 5/1985 | Germany ................................. 294/74 |

*Primary Examiner*—Johnny D. Cherry
*Attorney, Agent, or Firm*—Jones, Tullar & Cooper, P.C.

[57] ABSTRACT

The present invention embodies a novel method and apparatus for lifting and handling glass packs, glass sheets, plates, mirrors, and other large rectangular objects. The invention includes a sling assembly having a main sling and a built-in backup sling. If the main sling breaks, the backup sling will support the weight of the object being lifted. The backup sling is retained adjacent the main sling by a plurality of loops located along the length of the sling. The sling system also includes shoes which are located under the object during lifting, between the sling and the edges of the object. Upright ears are located on either end of the shoes for retaining the object on a flat upper surface and for preventing contact between the sling and the edges of the object. The sling system also includes caps for protecting the sling from the upper edges of the object.

20 Claims, 3 Drawing Sheets

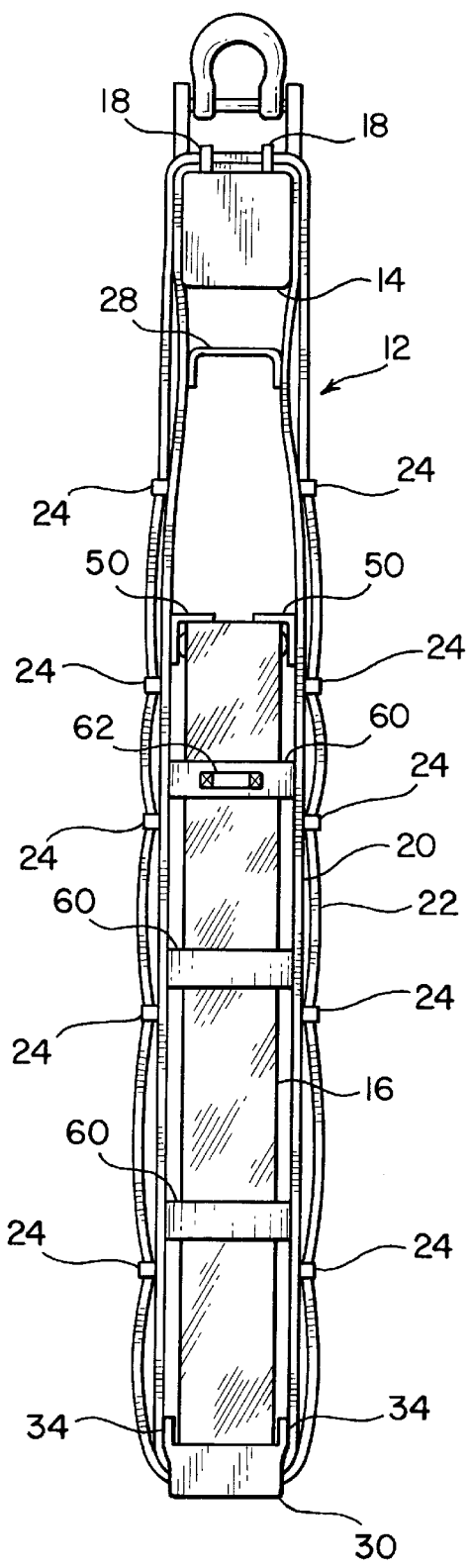
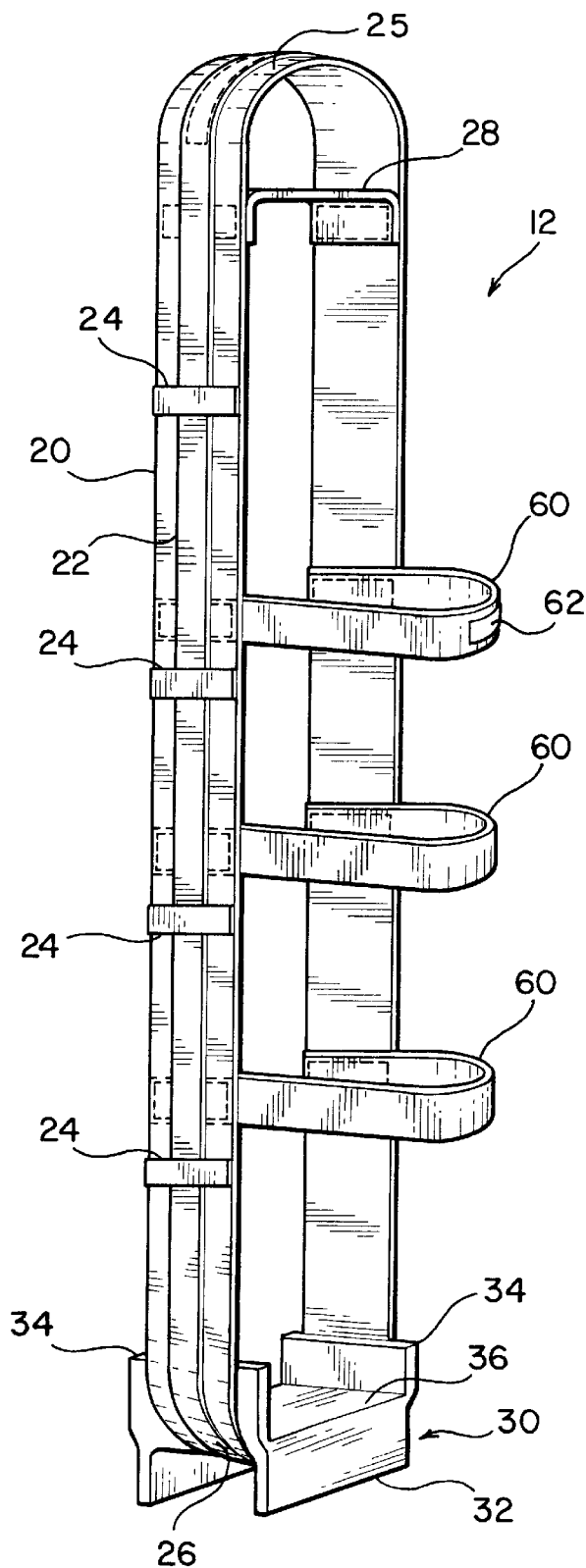

5,887,923

SLING SYSTEM AND METHOD FOR HANDLING SHEETS OR PLATES

FIELD OF THE INVENTION

This invention is directed to a sling system and method for handling large sheets or plates of materials. In particular, the sling is useful for lifting packs of glass sheets, mirrors, or other large, fragile sheet material.

BACKGROUND OF THE INVENTION

Glass and mirror sheets or plates have traditionally been transported in wooden crates padded with materials such as paper or polystyrene foam. A layer of padding is put in the bottom of the crate, the sheets of glass are stacked on top of the padding, then a second layer of padding is put on top of the glass, and the top of the crate is nailed on. This system provides good protection for the glass sheets during handling, but is wasteful of materials and manpower.

In light of this, it has become more common for glass sheets to be shipped without wooden crates or padding in units known as glass packs. A glass pack consists of a stack of glass sheets or mirrors held together as a single unit by strapping or the like. The glass sheets are held tightly together so that the unit may be treated as a single thick plate of glass. A glass pack does not include additional padding or packaging around the edges. Thus, the glass pack must be handled carefully so that the edges of the glass sheets are protected from chipping and cracking during handling. It is also necessary to protect the lifting equipment and personnel from the sharp edges of the glass.

In the prior art, it has been common to use web slings, typically of nylon or polyester, for lifting and handling glass packs. However, this is often done with the web in direct contact with the glass edges. This results in cutting and premature wear of the slings, possibly culminating in failure of a sling during lifting of a glass pack. Such an occurrence can result in breakage of the glass and possible injury to personnel.

Consequently, from an examination of the prior art, it is apparent that a need exists for a sling system which enables the safe and effective handling of glass packs, glass sheets, or similar objects. The system must protect the glass from damage, and also be durable, reliable, and easy to use. The present invention overcomes the shortcomings associated with the prior art handling devices, and provides a substantial advance in the art.

SUMMARY OF THE INVENTION

The present invention embodies a novel method and apparatus for handling glass packs, glass sheets, plates, mirrors, and other large rectangular objects. The invention includes a novel sling assembly having a main sling and a built-in backup sling. If the main sling breaks, the backup sling will support the object being lifted. The backup sling is retained on the main sling by loops located along the length of the main sling. The length of the main sling is slightly less than that of the backup sling so that the main sling supports the full weight of the object during lifting. Should the main sling fail, the backup sling will catch the object to prevent it from falling.

The sling system also includes shoes which are located under a glass pack during lifting, and which are disposed between the sling and the edges of the glass pack. The shoes are channel shaped and include a flat upper surface for receiving the bottom edge of the glass pack. Ears are located on either end of the shoes for retaining the glass pack on the flat upper surface, and for preventing contact between the sling and the edges of the glass pack. The shoes are mounted to the sling so that the shoes will not flip out of the sling during positioning.

The sling system also includes caps for protecting the sling from the upper edges of a glass pack. The caps are elongate members having a right-angle cross section. The caps are mounted on the upper edges of the glass pack between the edges of the glass and the sling. The caps are retained on the upper edges of the glass pack by suction cups or the like, and prevent the upper edges of the glass pack from cutting or otherwise damaging the sling assembly.

BRIEF DESCRIPTION OF THE DRAWINGS

FIG. 2 is a right side view of FIG. 1.

FIG. 3 is a perspective view of a sling assembly of the present invention.

DESCRIPTION OF THE PREFERRED EMBODIMENT

The invention is directed to a sling apparatus and method. The sling system is useful for handling glass packs, sheets of glass, mirrors, or other large rectangular objects. The system includes built-in backup slings which will hold the weight of the object being lifted should one of the main slings fail. The system also provides protection to the sling webbing and to the edges of the glass sheets.

Figure 1:
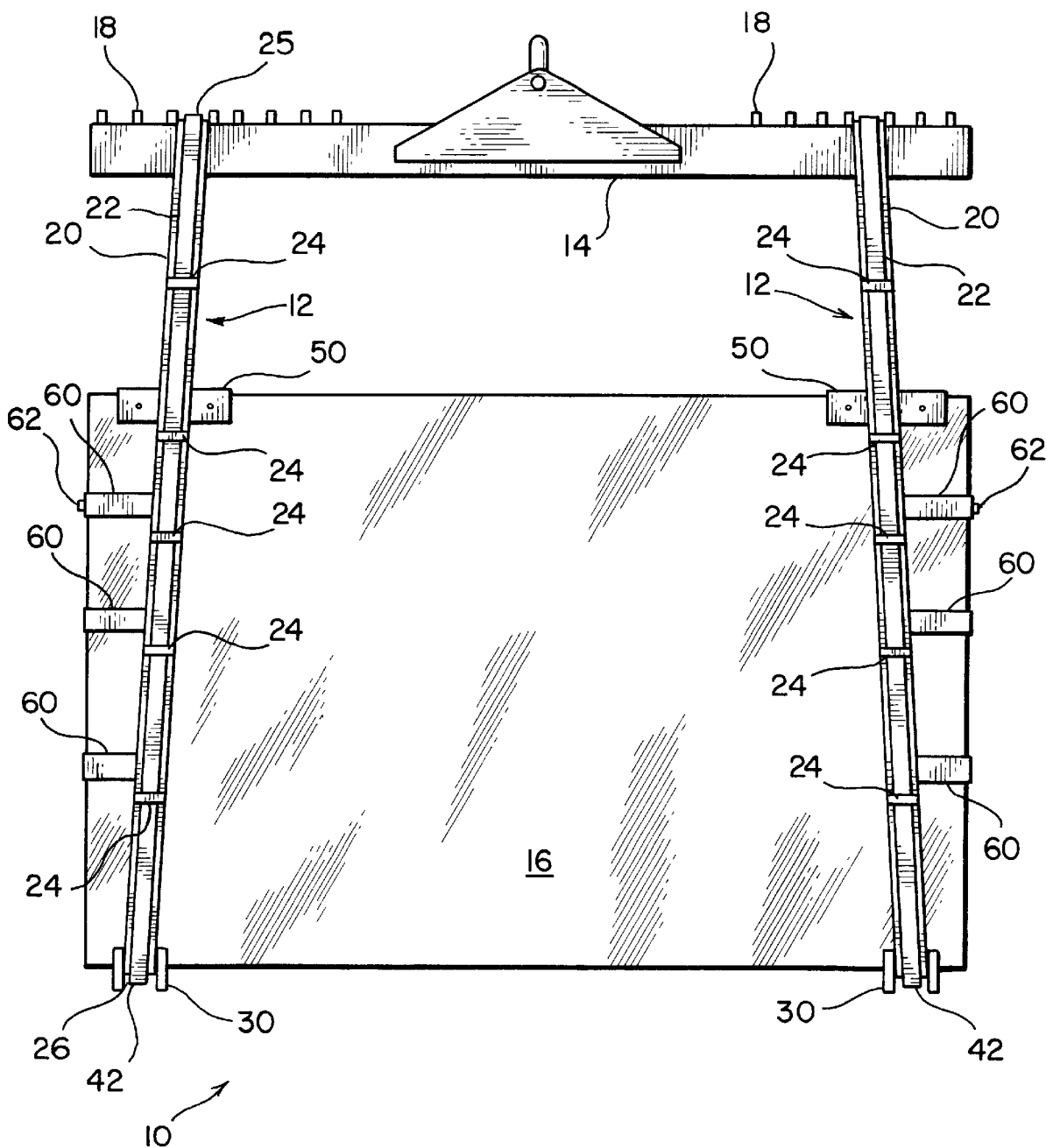
FIG. 1 is a front elevation of a sling apparatus 10 of the present invention supporting a glass pack.

FIGS. 1 and 2 illustrate a sling apparatus 10 of the present invention. The sling apparatus 10 includes a pair of generally identical sling assemblies 12. Sling assemblies 12 preferably are suspended from a spreader beam 14 or similar lifting apparatus for lifting a glass pack 16, or other object. Spreader beam 14 includes a plurality of projections 18 which enable positioning of sling assemblies 12 in a desired location for use with various sized objects. Spreader beam 14 may be lifted and manipulated using a crane, hoist, forklift, or other suitable lifting devices (not shown).

As also illustrated in FIG. 3, each sling assembly includes a main sling 20 and a backup sling 22 in a loop configuration. Main sling 20 is formed as a continuous loop, and backup sling 22 is formed as a slightly larger continuous loop concentric with the loop of main sling 20. Main sling 20 and backup sling 22 are preferably of a web material constructed from nylon, cotton, polyester, or other suitable materials.

In one preferred embodiment, main sling 20 is a 3" wide polyester strap with a rated capacity of 11,750 pounds. Backup sling 22 is a 2" wide polyester strap with a rated capacity of 6400 pounds. (Capacity rating is based upon a safety factor of 1/5 of the failure strength of the slings.) The web material is commercially available from Certified Sling Co. of Castleberry, Fla., and may include a CORDURA® anti-chaffing material sewn to the inner side. The web material may also include red tracer threads interwoven within the material. If the red tracer threads are visible, then damage has occurred to the sling and the sling should be replaced. A typical weight for glass pack 16 would be approximately 4000 pounds for this embodiment.

A plurality of retaining loops 24 are attached transversely to main sling 20 along its length for retaining backup sling 22 adjacent to main sling 20. Loops 24 are similar to belt loops, and allow backup sling 22 to move somewhat relative to the length of main sling 20. Alternatively, loops 24 could be sewn to backup sling 22 for encircling main sling 20, and other similar variations will be apparent to those skilled in the art. Loops 24 are of a material similar to the sling material, or of other suitable material, and may be attached to main sling 20 by sewing or other suitable methods.

Backup sling 22 is slightly longer than main sling 20 so that when an object is lifted, main sling 20 will take the full weight of the object. The slack in backup sling 22 allows use of sling assembly 12 with little or no wear occurring to backup sling 22. The slack in backup sling 22 should be sufficient so that there is still a slight amount of slack in backup sling 22 when main sling 20 is stretched under full load. Should main sling 20 fail while lifting a load, backup sling 22 will catch the load, thereby preventing the load from falling. Thus, it is undesirable to have too much slack, as this will increase the distance the load might fall before being caught by backup sling 22.

In a preferred embodiment, backup sling 22 is approximately 10 percent longer than main sling 20 under no load. Main sling 20 of the preferred embodiment has an elongation factor of approximately 7 percent when stretched under the rated load. Thus, under load, backup sling 22 is approximately 3 percent longer than main sling 20. The differences in length would be adjusted for materials have greater or smaller elongation factors.

In addition, it has been found desirable to sew backup sling 22 to main sling 20 for a short distance at the sling top portion 25 and at the sling bottom portion 26 so that backup sling 22 remains centered in relation to main sling 20. If all the slack of backup sling 22 became located on one side of the load, then, upon failure of main sling 20, the load may be off-center with respect to backup sling 22, possibly leading to undesirable results such as flopping or swinging of the load.

In addition, a clinching strap 28 is sewn between opposite sides of main sling 20 near sling top portion 25. As illustrated in FIG. 2, clinching strap 28 draws in main sling 20 slightly for helping to keep the sling assembly 12 firmly in place and centered on spreader beam 14, and for keeping glass pack 16 centered under spreader beam 14. By keeping sling assemblies 12 centered, glass pack 16 remains balanced during lifting with minimum twisting or flopping back and forth within sling assemblies 12.

Figures 4, 5:
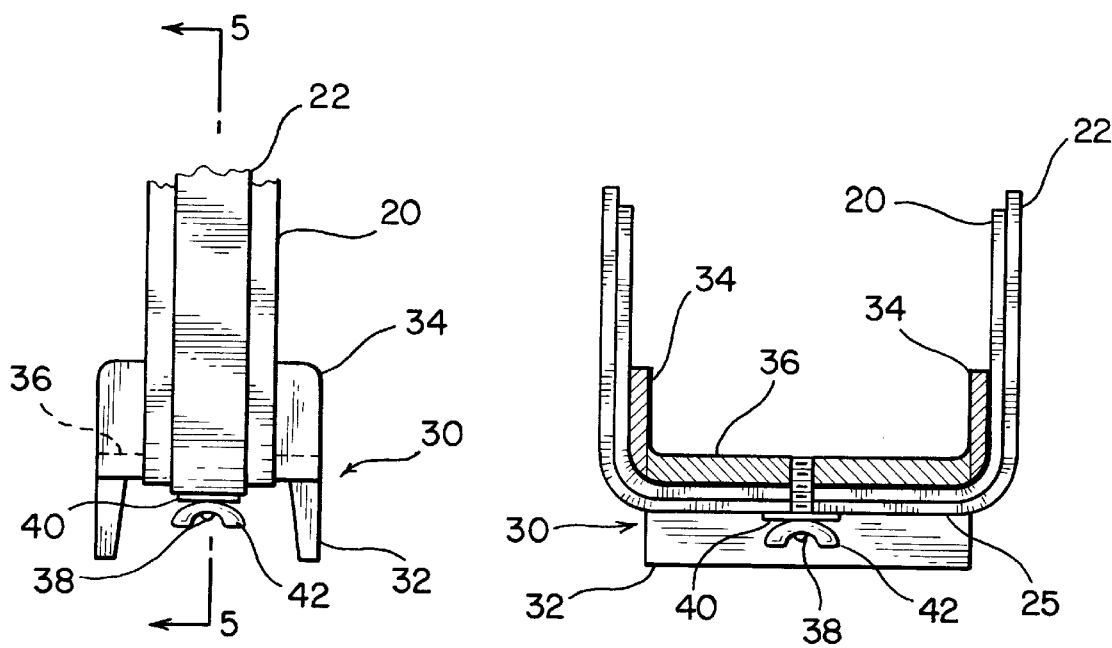
FIG. 4 shows an end view of a shoe of the present invention with sling attached.
FIG. 5 shows a view taken along line 5—5 of FIG. 4.

Located at sling bottom portion 26 of each sling assembly 12 is a shoe 30 for supporting glass pack 16. As illustrated in FIGS. 4 and 5, shoe 30 has a base 32 constructed from a channel of metal, and has upright ears 34 projecting upward from either end of base 32 for preventing main sling 20 from coming into contact with glass pack 16. Thus, ears 34 prevent main sling 20 from being cut by the edges of glass pack 16. Ears 34 are metal plates welded to base 32, and a flat surface 36 is provided between ears 34 for receiving and supporting the bottom edge of glass pack 16 or other object to be lifted.

The entire shoe 30 is coated with polyvinyl chloride, rubber, or other polymer material to prevent glass pack 16 from being damaged should it be hit or bumped by a shoe 30. In addition, the rubber coating provides a soft, non-slip, high friction surface on flat surface 36 for glass pack 16 to engage with.

Each shoe includes a threaded pin 38 located in the center of base 32 and projecting through holes formed through main sling 20 and backup sling 22. A threaded hole is formed in base 32 for receiving threaded pin 38. Following insertion, threaded pin is either welded or swedged into place. A washer 40 and wing nut 42 are mounted on threaded pin 38 and retain shoe 30 on main sling 20 and backup sling 22. Thus, shoe 30 is attached to sling assembly 12 at all times during application or removal of sling assembly 12 from glass pack 16. Shoes 30 will not flip out of sling assembly 12, a situation which may otherwise occur if shoes 30 were not attached to sling assembly 12.

Shoes 30 are available having different lengths between ears 34 for fitting various widths of glass packs 16. Furthermore, shoes 30 may act as a load-limiting means since a glass pack 16 that is too wide will not fit between the ears of too small a shoe 30. Thus, since shoes 30 are attached to sling assembly 12, sling assembly 12 cannot be used to attempt to lift a larger glass pack 16 than that for which it was designed.

Figures 6, 7:
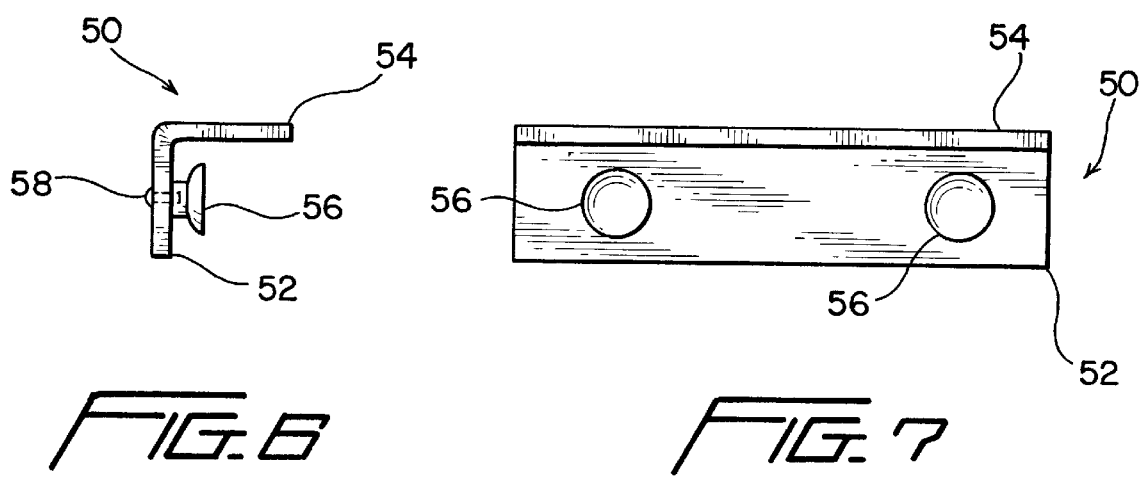
FIG. 6 shows a side view of a cap of the present invention.
FIG. 7 shows a front view of a cap of the present invention.

The sling system of the present invention also includes caps 50 for placement on the upper edges of glass pack 16. Caps 50 are placed on each side of glass pack 16 between main sling 20 and the upper edge of glass pack 16. As illustrated in FIGS. 6 and 7, a cap 50 is an elongate member having a right-angle cross section. Caps 50 may be constructed of metal, polymer, fiberglass, or other suitable material, and may be coated with polyvinyl chloride, rubber, or other material which will prevent scratching or chipping of the glass edges and surfaces.

Each cap 50 has a vertical leg 52 and a horizontal leg 54. A pair of suction cups 56 are located on the inside wall of vertical leg 52. Suction cups 56 are retained on vertical leg 52 by screws 58 which pass through holes in vertical leg 52 and thread directly into the backside of suction cups 56. Suction cups 56 enable caps 50 to be securely removably mounted on the upper edge of glass pack 16 for preventing sling assembly 12 from contacting the sharp upper edges of glass pack 16. While there is little direct pressure contact between sling assembly 20 and the upper edge of glass pack 16, there is still a sufficient amount due to flopping back and forth of glass pack 16, which could cause wear or cutting of main sling 20 over time. Caps 50 eliminate any such wear on the upper portions of sling assembly 12.

Sling assembly 12 may also include a plurality of side straps 60 for retaining glass pack 16 within sling assemblies 12 during lifting procedures. Side straps 60 may be constructed from the same web material as main sling 20 or backup sling 22, or other suitable material, and are sewn to the inner surface of main sling 20. Side straps 60 may increase in length from bottom to top along sling assembly 12 so that they will engage with the sides of glass pack 16 when sling assembly 12 is suspended from spreader beam 14 at a slight angle.

A tag line loop 62 may be sewn to the outer surface of one or more of side straps 60 for attaching a tag line (not shown) for use during lifting operations. In hoisting operations, one or more tag lines are commonly used for maneuvering a load by hand while the load is suspended. To facilitate such use, tag line loops 62 provide a convenient attachment point for a tag line on either end of glass pack 16.

Tag line loops 62 may be constructed from the same material as the sling webbing, or from other suitable materials. Tag line loops 62 may be attached to side straps 60 by sewing or other suitable means, so long as tag line loops 62 are firmly attached, and preferably able to support a force at least equal to the body weight of a worker.

Furthermore, it will be recognized by those skilled in the art that a single sling assembly 12 might be used for various lifting applications. In any of the numerous situations in which a conventional sling might be used, a sling assembly of the present invention may be substituted, and thereby provide a built-in redundant safety feature during lifting. Thus, although preferred embodiments have been described herein, it will be recognized that a variety of changes and modifications may be made without departing from the spirit of the subject invention, the scope of which is set forth in the following claims.

What is claimed is:

1. A method for hoisting an object, said method comprising:

providing a main sling for supporting the weight of the object being lifted;

providing a backup sling, said backup sling being of greater length than said main sling, said backup sling being retained adjacent to said main sling by a retaining means attached to said main sling or said backup sling; and hoisting the object such that said main sling supports the entire weight of the object, and, whereby, should said main sling fail, said backup sling will support the weight of the object.

2. The method of claim 1 further including the step of attaching a shoe to said main sling and said backup sling prior to hoisting the object, said shoe including a surface for supporting the object, said surface being disposed between the object and said main sling and said backup sling.

3. The method of claim 1 wherein the step of providing a backup sling includes the step of providing a backup sling that is at least 3 percent longer than said main sling when said main sling is supporting the object, whereby there is a slack in said backup sling so that said backup sling supports substantially no weight during hoisting.

4. The method of claim 1 further including the step of providing a protective means interposed between said main sling, said backup sling, and the upper edges of the object to prevent said main sling and said backup sling from contacting and wearing against the upper edges of the object.

5. The method of claim 1 further including the step of providing two main sling, each said main sling having a backup sling retained adjacent thereto, and attaching said main slings to a spreader beam, with said main slings being suspended from opposite ends of said spreader beam for hoisting the object.

6. A sling apparatus for handling an object, said apparatus comprising:

at least one sling assembly, said sling assembly including a main sling for supporting the object, said sling assembly further including an independent backup sling, said backup sling being retained in contact with said main sling, said backup sling being slightly longer than said main sling whereby, during lifting, said main sling will support substantially the entire weight of the object, but should said main sling fail, said backup sling will support the weight of the object previously supported by the main sling.

7. The apparatus of claim 6 further including a shoe attached to said sling assembly, said shoe including a surface for supporting the object, said surface being disposed between the object and said sling assembly.

8. The apparatus of claim 7 in which said main sling is constructed from a flat web material, and said backup sling is also constructed from a flat web material, with said main sling and said backup sling being retained in contact with each other by a plurality of loops which enable said backup sling to move relative to main sling.

9. The apparatus of claim 8 in which said main sling is retained in contact with said backup sling by loops attached to either said main sling or said backup sling, and in which said sling assembly is attached to said shoe by a threaded pin attached to said shoe and passing through said sling assembly, and further in which said main sling is sewn to said backup sling in the vicinity of said pin.

10. The apparatus of claim 6 further including a protective means interposed between said main sling, said backup sling, and the upper edges of the object to prevent said main sling and said backup sling from contacting and wearing against the upper edges of the object.

11. The apparatus of claim 10 in which said protective means includes a pair of caps for use with each said sling assembly, said caps being mounted on the upper edges of the object to prevent said sling assembly from contacting the upper edges, said caps being formed as elongate angles retained on said upper edges of the object by suction cups.

12. The apparatus of claim 6 in which said backup sling includes sufficient slack such that said backup sling is at least 3 percent longer than said main sling when said main sling is supporting the object.

13. The apparatus of claim 6 in which said sling assembly is in the form of a loop, with said main sling forming a continuous inner loop and said backup sling forming a concentric continuous outer loop around said main sling, said backup sling being retained adjacent to said main sling by a plurality of loops attached to either said main sling or said backup sling.

14. A sling apparatus for lifting an object, said apparatus comprising:

a main sling in the form of a first loop of web material for supporting the object; and a backup sling in the form of a second loop of web material, said backup sling being retained adjacent to said main sling, said backup sling being slightly longer than said main sling, whereby there is slack in said backup sling during lifting of the object, and, further whereby, should said main sling fail, said backup sling will support the weight of the object previously supported by the main sling.

15. The apparatus of claim 14 further including a shoe attached to said sling assembly, said shoe including a surface for supporting the object, said surface being disposed between the object and said sling assembly, and wherein said shoe includes a pair of ears extending upwards from said surface so that the object may be disposed between said ears, said ears preventing contact between the object and said sling assembly.

16. The apparatus of claim 14 in which said main sling is retained adjacent to said backup sling by loops attached to either said main sling or said backup sling.

17. The apparatus of claim 14 further including a protective means interposed between said main sling, said backup sling, and the upper edges of the object to prevent said main sling and said backup sling from contacting and wearing against the upper edges of the object.

18. The apparatus of claim 14 in which said slack in said backup sling is sufficient such that said backup sling is at least 3 percent longer than said main sling when said main sling is supporting the object.

19. The apparatus of claim 14 in which said backup sling and said main sling are constructed from a flat web material, and wherein said backup sling is retained adjacent to said main sling by a plurality of belt-loop-type loops attached to either said main sling or said backup sling so that said backup sling can move relative to said main sling.

20. The apparatus of claim 14 in which said main sling forms a continuous inner loop and said backup sling forms a concentric continuous outer loop around said main sling, said backup sling being retained adjacent to said main sling by a plurality of loops attached to either said main sling or said backup sling.

* * * * *